(12) United States Patent
Lee et al.

(10) Patent No.: US 10,353,134 B2
(45) Date of Patent: Jul. 16, 2019

(54) BACKLIGHT UNIT AND DISPLAY DEVICE INCLUDING THE SAME

(71) Applicant: Samsung Display Co., LTD., Yongin-si, Gyeonggi-Do (KR)

(72) Inventors: Luly Lee, Yongin-si (KR); Donghyeon Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 589 days.

(21) Appl. No.: 15/091,114

(22) Filed: Apr. 5, 2016

(65) Prior Publication Data

US 2017/0010406 A1    Jan. 12, 2017

(30) Foreign Application Priority Data

Jul. 8, 2015    (KR) .......................... 10-2015-0097313

(51) Int. Cl.
*F21V 8/00*    (2006.01)

(52) U.S. Cl.
CPC ......... *G02B 6/0066* (2013.01); *G02B 6/0025* (2013.01); *G02B 6/0031* (2013.01)

(58) Field of Classification Search
CPC ... G02B 6/0025; G02B 6/0031; G02B 6/0066
USPC .......... 362/23.09, 23.1, 23.16, 608, 610, 611
See application file for complete search history.

(56) References Cited

U.S. PATENT DOCUMENTS

| | | | | |
|---|---|---|---|---|
| 6,186,649 B1* | 2/2001 | Zou | ......................... | F21V 7/005 362/217.05 |
| 7,532,800 B2* | 5/2009 | Iimura | ................. | G02B 6/0018 362/610 |
| 7,954,989 B2* | 6/2011 | Fan | ....................... | G02B 6/0025 362/558 |
| 2005/0036335 A1* | 2/2005 | Ohtomo | ............ | G02F 1/133308 362/559 |
| 2005/0084229 A1* | 4/2005 | Babbitt | ................ | G02B 6/0003 385/146 |
| 2009/0109706 A1* | 4/2009 | Hsu | ....................... | G02B 6/0066 362/97.3 |

(Continued)

FOREIGN PATENT DOCUMENTS

| | | |
|---|---|---|
| KR | 101414605 B1 | 6/2014 |
| KR | 101475314 B1 | 12/2014 |

(Continued)

*Primary Examiner* — Robert J May
*Assistant Examiner* — Leah Simone Macchiarolo
(74) *Attorney, Agent, or Firm* — Cantor Colburn LLP (57) ABSTRACT

A backlight unit includes a light guide member including an incident surface extending in a first direction and a light source unit which generates a light, provides the light to the incident surface includes a body member extending in the first direction to define a cavity therein and includes a light exit part defined in one side portion facing the incident surface and connected to the cavity, a first light source disposed in the cavity and including a laser diode generating a first light having a first color, and a second light source disposed in the cavity spaced apart from the first light source in the first direction and including a laser diode generating a second light having a second color where the body member provides a third light having a third color obtained by combining the first and second colors to the incident surface through the light exit part.

20 Claims, 9 Drawing Sheets

(56) References Cited

U.S. PATENT DOCUMENTS

| | | | |
|---|---|---|---|
| 2010/0290247 A1* | 11/2010 | Im | G02B 6/0091 |
| | | | 362/606 |
| 2012/0020113 A1* | 1/2012 | Zheng | G02B 6/0021 |
| | | | 362/612 |
| 2012/0106127 A1 | 5/2012 | Hattori et al. | |
| 2015/0219966 A1* | 8/2015 | Song | G02B 19/0071 |
| | | | 362/97.3 |
| 2016/0047968 A1* | 2/2016 | Lin | G02B 6/0031 |
| | | | 362/609 |
| 2016/0187563 A1* | 6/2016 | Lee | G02B 6/0091 |
| | | | 362/608 |
| 2016/0363716 A1* | 12/2016 | You | G02B 6/0068 |
| 2017/0205047 A1* | 7/2017 | Cha | F21K 9/64 |

FOREIGN PATENT DOCUMENTS

| | | | |
|---|---|---|---|
| KR | 1020160148106 | * | 12/2016 |
| WO | 2012111190 A1 | | 8/2012 |

* cited by examiner

BACKLIGHT UNIT AND DISPLAY DEVICE INCLUDING THE SAME

This application claims priority to Korean Patent Application No. 10-2015-0097313, filed on Jul. 8, 2015, and all the benefits accruing therefrom under 35 U.S.C. § 119, the content of which in its entirety is herein incorporated by reference.

BACKGROUND

1. Field

Exemplary embodiments of the invention relate to a backlight unit and a display device having the same. More particularly, exemplary embodiments of the invention relate to a backlight unit having a laser diode and a display device having the backlight unit.

2. Description of the Related Art

In a non-self-emissive display device such as a liquid crystal display ("LCD"), a display panel displaying an image does not self-emit light. The non-self-emissive display device displays the image using a light provided from a backlight unit. The backlight unit generally includes a light source and a light guide member converting the light emitted from the light source to a surface light.

The light guide member guides and diffuses the light incident thereto through a side portion of the light guide member, and then the diffused light is provided to an entire surface of the display panel. The light incident to the light guide member travels through the light guide member and exits through an entire surface of the light guide plate.

SUMMARY

The invention provides a backlight unit which controls directivity of a laser beam output from a laser diode to provide uniform light.

The invention provides a display device having improved color reproducibility using a laser diode.

Exemplary embodiments of the invention provide a backlight unit including a light guide member including an upper surface substantially parallel to a plane defined by a first direction and a second direction crossing the first direction, a lower surface spaced apart from the upper surface in a third direction crossing the first and second directions, and a plurality of connection surfaces connecting the upper surface and the lower surface, at least one connection surface of the plurality of connection surfaces being provided with an incident surface defined therein, and a light source unit generating a light and providing the light to the incident surface.

In an exemplary embodiment, the light source unit may include a body member including a cavity extending in the first direction and defined therein and a light exit part defined therein, one side portion of the cavity being opened and the light exit part being connected to one side portion of the cavity, which faces the incident surface, a first light source disposed in the cavity and including a laser diode generating a first light having a first color, and a second light source disposed in the cavity to be spaced apart from the first light source in the first direction and including a laser diode generating a second light having a second color. The body member may provide a third light having a third color obtained by combining the first and second colors to the incident surface through the light exit part.

In an exemplary embodiment, the incident surface may be substantially parallel to a plane defined by the first direction and the third direction and the light exit part is a slit extending in the first direction.

In an exemplary embodiment, a width of the light exit part in the third direction may be equal to or smaller than a width of the incident surface in the third direction.

In an exemplary embodiment, the width of the light exit part in the third direction may be substantially the same as the width of the incident surface in the third direction.

In an exemplary embodiment, at least a portion of the light guide member may be inserted into the light exit part and the incident surface is exposed in the cavity.

In an exemplary embodiment, the cavity may have a circular shape on a plane defined by the second direction and the third direction.

In an exemplary embodiment, the body member may include an inner side surface defining the cavity and an outer side surface connected to the inner side surface and defining an outer shape of the body member. The light exit part may be defined at a position at which the inner side surface is connected to the outer side surface, and the first and second lights are reflected by the inner side surface and combined with each other.

In an exemplary embodiment, the light source unit further may include a reflective layer covering the inner side surface.

In an exemplary embodiment, the light source unit further may include a scattering layer covering the reflective layer and being exposed to the cavity.

In an exemplary embodiment, the scattering layer further may include a plurality of lens patterns.

In an exemplary embodiment, the light source unit further may include a transparent matrix filled in the cavity and a plurality of beads distributed in the matrix.

In an exemplary embodiment, a path in which the first light emitted from the first light source travels and a path in which the second light emitted from the second light source travels may be inclined at a predetermined angle with respect to the first direction.

In an exemplary embodiment, the third color may be a white color.

In an exemplary embodiment, the first color may be different from the second color.

In an exemplary embodiment, the first color, the second color, and the third color may be same as each other.

Exemplary embodiments of the invention provide a display device including a display panel displaying through an entire surface defined by a first direction and a second direction crossing the first direction, a backlight unit disposed at a rear surface of the display panel to provide a light to the display panel, and an accommodating member accommodating the display panel and the backlight unit.

In an exemplary embodiment, the backlight unit may include a light source unit including a cavity defined therein and extending in the first direction and a light exit part extending in the first direction and connected to the cavity and providing the light to the second direction through the light exit part and a light guide member including an upper surface facing the rear surface, a lower surface facing the upper surface, first and second surfaces extending in the first direction and facing each other in the second direction, and third and fourth surfaces extending in the second direction and facing each other in the first direction. The light exit part faces the first surface, the light source unit includes at least one laser diode, and the laser diode provides the light to the cavity.

In an exemplary embodiment, the cavity may have a circular shape in a cross-section on a plane defined by the second direction and a thickness direction of the light guide member.

In an exemplary embodiment, the light source unit may include a body member defining the cavity and the light exit part, a first light source disposed at one side portion of the body member and providing the light to the cavity, and a second light source disposed at the other side portion of the body member, spaced apart from the first light source in the first direction, and including a second light source providing a light to the cavity. Each of the first and second light sources includes a laser diode.

In an exemplary embodiment, at least a portion of the light guide member may be inserted into the light exit part and the first surface is provided in the cavity.

In an exemplary embodiment, the accommodating member may include a bottom portion disposed under the backlight unit and a sidewall portion bent upward from edges of the bottom portion and defining a predetermined space together with the bottom portion. The bottom portion has a stepped shape to support the light source unit and the light guide member.

According to the above exemplary embodiments, the backlight unit may include the body member in which the cavity extending in one direction is defined and the light source unit including the light sources spaced apart from each other in the one direction. The light emitted from the light sources are reflected or scattered by the body member to travel in the cavity and combined with each other. Therefore, the backlight unit mitigates the directivity of the laser beam and provides the uniform light.

In addition, the display device may display the image using the laser beam having narrow wavelength band, and thus the color reproducibility of the display device may be improved. Thus, the colors of the image may be improved and natural images may be provided to users.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

Hereinafter, the invention will be explained in detail with reference to the accompanying drawings. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 1:
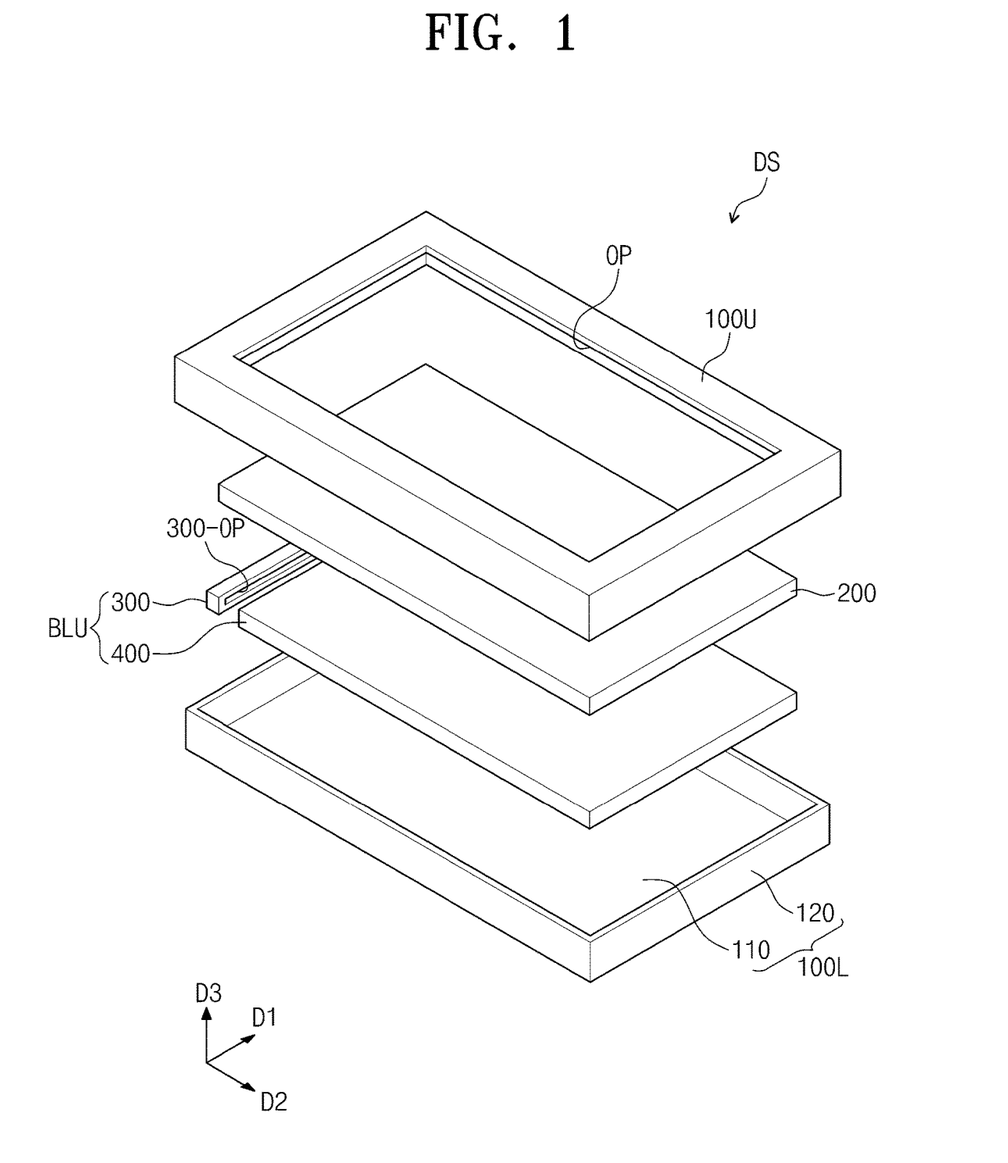
FIG. 1 is an exploded perspective view showing an exemplary embodiment of a display device according to the invention.
Figure 2:
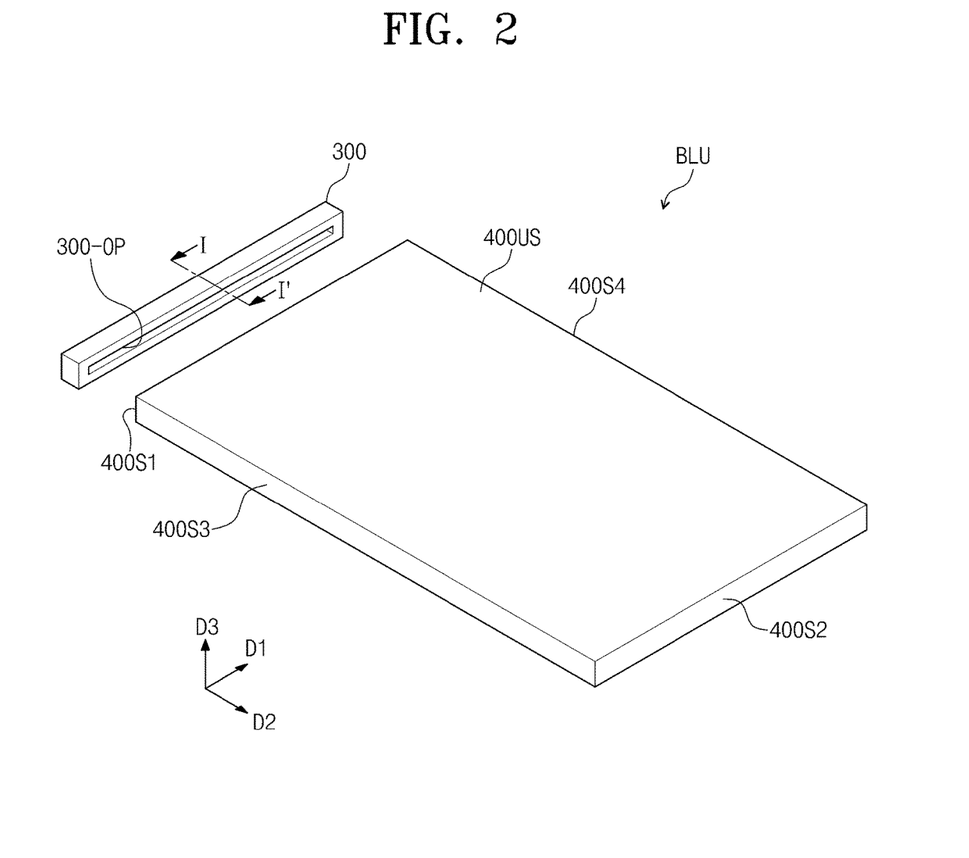
FIG. 2 is a perspective view showing a portion of the display device shown in FIG. 1.

FIG. 1 is an exploded perspective view showing a display device DS according to an exemplary embodiment of the invention and FIG. 2 is a perspective view showing a portion of the display device DS shown in FIG. 1. Hereinafter, the display device DS will be described in detail with reference to FIGS. 1 and 2.

Referring to FIG. 1, the display device DS includes an accommodating member, a display panel 200, and a backlight unit BLU. The accommodating member includes an upper protective member 100U and a lower protective member 100L.

The upper protective member 100U and the lower protective member 100L define an outer shape of the display device DS. The upper protective member 100U and the lower protective member 100L are coupled to each other to define an inner space. The display panel 200 and the backlight unit BLU are accommodated in the inner space.

The lower protective member 100L includes a bottom portion 110 and a sidewall portion 120. The bottom portion 110 is substantially parallel to a plane defined by a first direction D1 crossing a second direction D2.

The bottom portion 110 may have various shapes. The bottom portion 110 may have a shape corresponding to a shape of each of the display panel 200 and the backlight unit BLU when viewed in a plan view. In an exemplary embodiment, the bottom portion 110 may have a substantially rectangular shape when viewed in a plan view, for example.

The sidewall portion 120 is bent upward from the bottom portion 110 along a third direction D3. The sidewall portion 120 extends in the third direction D3 from edges of the bottom portion 110. The sidewall portion 120 surrounds the edges of the bottom portion 110.

The lower protective member 100L defines a predetermined space corresponding to the shape of the bottom portion 110 when viewed in a plan view. Elements of the display device DS are accommodated in the predetermined spaced of the lower protective member 100L.

The upper protective member 100U is disposed on the lower protective member 100L to cover the lower protective member 100L. When the upper protective member 100U is coupled to the lower protective member 100L, the upper protective member 100U is disposed on the sidewall portion 120 and spaced apart from the bottom portion 110 to maintain the predetermined space.

The upper protective member 100U is provided with an opening OP defined therethrough. At least a portion of the display panel 200 is exposed through the opening OP. A user perceives an image displayed on the display panel 200 through the opening OP.

The display panel 200 displays the image in response to an electrical signal. In an exemplary embodiment, the display panel 200 may be a liquid crystal display ("LCD") panel, an organic light emitting display panel, an electrophoretic display panel, or an electrowetting display panel, for example. In the illustrated exemplary embodiment, the LCD panel will be described as the display panel 200.

The backlight unit BLU is disposed under the display panel 200. The backlight unit BLU generates the light and provides the display panel 200 with the light. The backlight unit BLU includes a light source unit 300 and a light guide member 400.

The light source unit 300 emits the light. As shown in FIG. 2, the light source unit 300 extends in the first direction D1. The light source unit 300 includes at least one light exit portion 300-OP defined in a side portion thereof. The light generated by the light source unit 300 exits to the outside thereof through the light exit portion 300-OP.

A slit shape extending in the first direction D1 is defined in the light exit portion 300-OP. Accordingly, the light source unit 300 serves as a linear light source or a surface light source. This will be described in detail later.

The light guide member 400 receives the light from the light source unit 300 and provides the light to the display panel 200. The light guide member 400 changes a path of the light traveling in the first direction D1 or the second direction D2 to the third direction D3 and enhances an area through which the light exits to provide the light to the entire surface of the display panel 200.

The light guide member 400 has substantially a rectangular parallelepiped shape defined by plural surfaces. The surfaces include an upper surface 400US, a lower surface (not shown), and a plurality of connection surfaces 400S1 to 400S4.

The upper surface 400US faces the display panel 200 and the lower surface faces the bottom portion 110. In this case, the upper surface 400US corresponds to an exit surface. The light incident to the light guide member 400 passes through the light guide member 400 and exits through the entire surface of the upper surface 400US toward the display panel 200.

The upper surface 400US and the lower surface are spaced apart from each other in the third direction D3. A distance between the upper surface 400US and the lower surface is determined depending on a thickness of the light guide member 400.

The connection surfaces 400S1 to 400S4 connect the upper surface 400US and the lower surface. The connection surfaces 400S1 to 400S4 include first, second, third, and fourth surfaces 400S1, 400S2, 400S3, and 400S4.

The first and second surfaces 400S1 and 400S2 extend in the first direction D1 and are spaced apart from each other in the second direction D2. The third and fourth surfaces 400S3 and 400S4 extend in the second direction D2 and are spaced apart from each other in the first direction D1.

Among the connection surfaces 400S1 to 400S4, at least one connection surface serves as an incident surface. In the illustrated exemplary embodiment, the light exit portion 300-OP faces the first surface 400S1. Therefore, the incident surface is defined in the first surface 400S1. The light guide member 400 according to the illustrated exemplary embodiment receives the light through the entire surface of the first surface 400S1.

The light exit portion 300-OP has a shape determined by the shape of the first surface 400S1 corresponding to the incident surface. The light exit portion 300-OP has a width smaller than a width of the first surface 400S1 in the first direction D1. In addition, the light exit portion 300-OP has a width smaller than a width of the first surface 400S1 in the third direction D3.

As the entire surface of the light exit portion 300-OP is covered by the first surface 400S1 when viewed in a plan view defined by the first and third directions D1 and D3, the light exiting from the light exit portion 300-OP may be easily incident to the light guide member 400 without leaking. The light exit portion 300-OP may have various shapes as long as the light exit portion 300-OP is covered by the first surface 400S1 when viewed in a plan view.

Figure 3A:
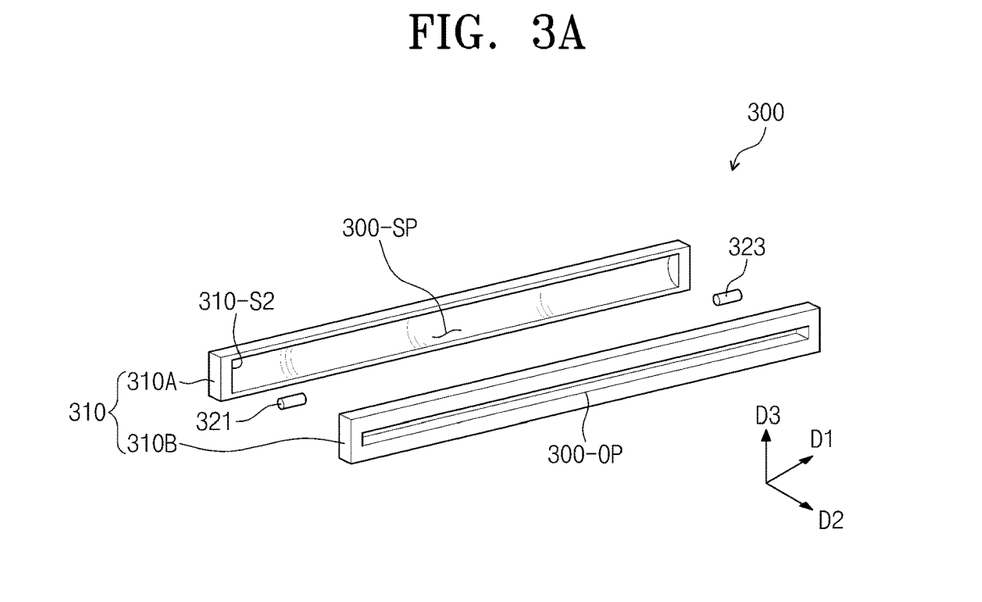
FIG. 3A is an exploded perspective view showing an exemplary embodiment of a light source unit according to the invention.
Figure 3B:
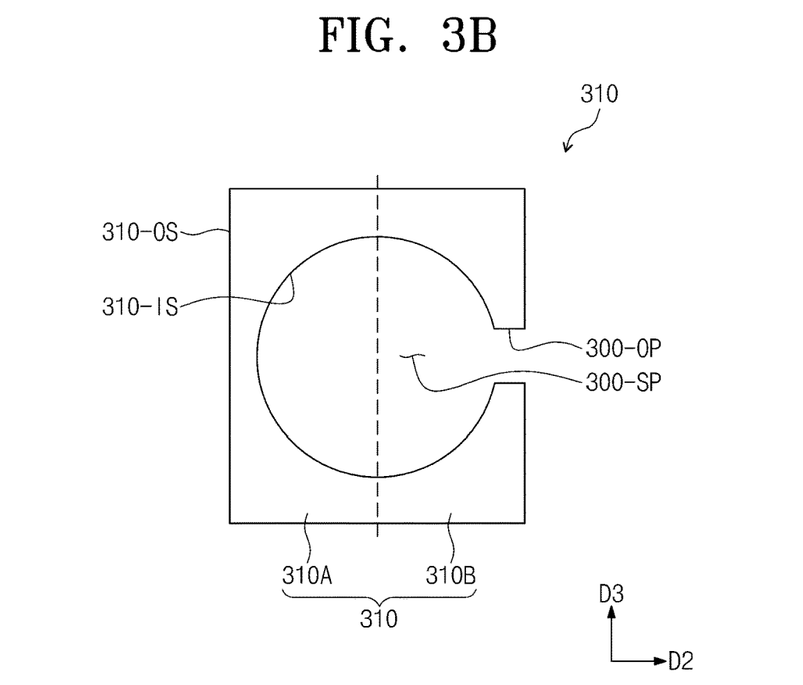
FIG. 3B is a cross-sectional view showing the light source unit shown in FIG. 3A.

FIG. 3A is an exploded perspective view showing the light source unit 300 according to an exemplary embodiment of the invention, FIG. 3B is a cross-sectional view showing the light source unit 300 shown in FIG. 3A.

FIG. 3B shows the cross-sectional view taken along the line I-I' shown in FIG. 2. Hereinafter, the light source unit 300 will be described in detail with reference to FIGS. 3A and 3B.

The light source unit 300 includes a body member 310 and a plurality of light sources 321 and 323 which are disposed on inner side surfaces 310-S2. The body member 310 includes a predetermined cavity 300-SP defined therein. For the convenience of explanation, the body member 310 is shown in two parts, e.g., a first part 310A and a second part 310B.

However, the structure of the body member 310 should not be limited thereto or thereby. In an exemplary embodiment, each of the first and second parts 310A and 310B may have different shapes from those shown in FIG. 3A, for example. In another exemplary embodiment, the body member 310 may be unitary in a single unit.

The first part 310A defines a portion of the cavity 300-SP and the second part 310B defines the other portion of the cavity 300-SP. The first and second parts 310A and 310B are coupled to each other to seal the cavity 300-SP except for the light exit part 300-OP.

The light exit part 300-OP is defined in the second part 310B. The light exit part 300-OP is connected to one side of the cavity 300-SP and serves as a path between the cavity 300-SP and the outside of the cavity 300-SP.

In detail, the body member 310 includes an inner side surface 310-IS and an outer side surface 310-OS. The inner side surface 310-IS defines the shape of the cavity 300-SP.

The inner side surface 310-IS defines the shape of the cavity 300-SP and the outer side surface 310-OS defines the shape of the body member 310.

The light exit part 300-OP may be defined in an area in which the inner side surface 310-IS is connected to the outer side surface 310-OS. Thus, the light exit part 300-OP connects the cavity 300-SP and the outside of the body member 310.

The first and second light sources 321 and 323 are disposed in the body member 310. Each of the first and second light sources 321 and 323 emits the light. The light emitted from the first and second light sources 321 and 323 travels through the cavity 300-SP.

Each of the first and second light sources 321 and 323 includes at least one light emitting device and a driving circuit connected to the light emitting device. The driving circuit applies an electrical signal to the light emitting device to drive the light emitting device.

The light emitting device emits the light in response to the electrical signal. Each of the first and second light sources 321 and 323 may include various light emitting devices. In the illustrated exemplary embodiment, each of the first and second light sources 321 and 323 includes a laser diode.

The laser diode oscillates the light through a resonant structure. Accordingly, the lights emitted from the first and second light sources 321 and 323 have a relatively high directivity, a single wavelength, and a high coherence.

The first and second light sources 321 and 323 according to the illustrated exemplary embodiment emit the lights to a direction other than the second direction D2 on which the incident surface exists. When the lights are directly applied to the light guide member 400 using the first and second light sources 321 and 323, a speckle phenomenon occurs due to the high directivity of the light.

The light source unit 300 according to the illustrated exemplary embodiment further includes the body member 310 and controls the emission direction of the lights emitted from the first and second light sources 321 and 323, which is different from the second direction D2, and thus a variety of problems caused by the directivity of the light may be mitigated.

The body member 310 reflects or scatters the lights emitted from the first and second light sources 321 and 323. Each of the lights emitted from the first and second light sources 321 and 323 is reflected by or scattered by the inner side surface 310-IS. As shown in FIG. 3B, the cavity 300-SP has a substantially circular shape in a cross-section defined by the second and third directions D2 and D3.

Therefore, although the lights emitted from the first and second light sources 321 and 323 are incident to the cavity 300-SP at various angles and reflected by the inner side surface 310-IS of the body member 310 at various angles, the lights are easily condensed to a center portion of the cavity 300-SP.

The condensed lights are combined with each other and exit to the outside of the body member 310 through the light exit part 300-OP. Thus, the light exiting from the light exit part 300-OP may be a uniform light. Due to the combination of the lights in the cavity 300-SP, the light having a uniform color may exit through the entire are of the light exit part 300-OP.

The light source unit 300 according to the illustrated exemplary embodiment includes the body member 310 with the cavity 300-SP having the circular shape, and thus the surface light source may be easily realized using the light having high directivity. This will be described in detail later.

Figure 4A:
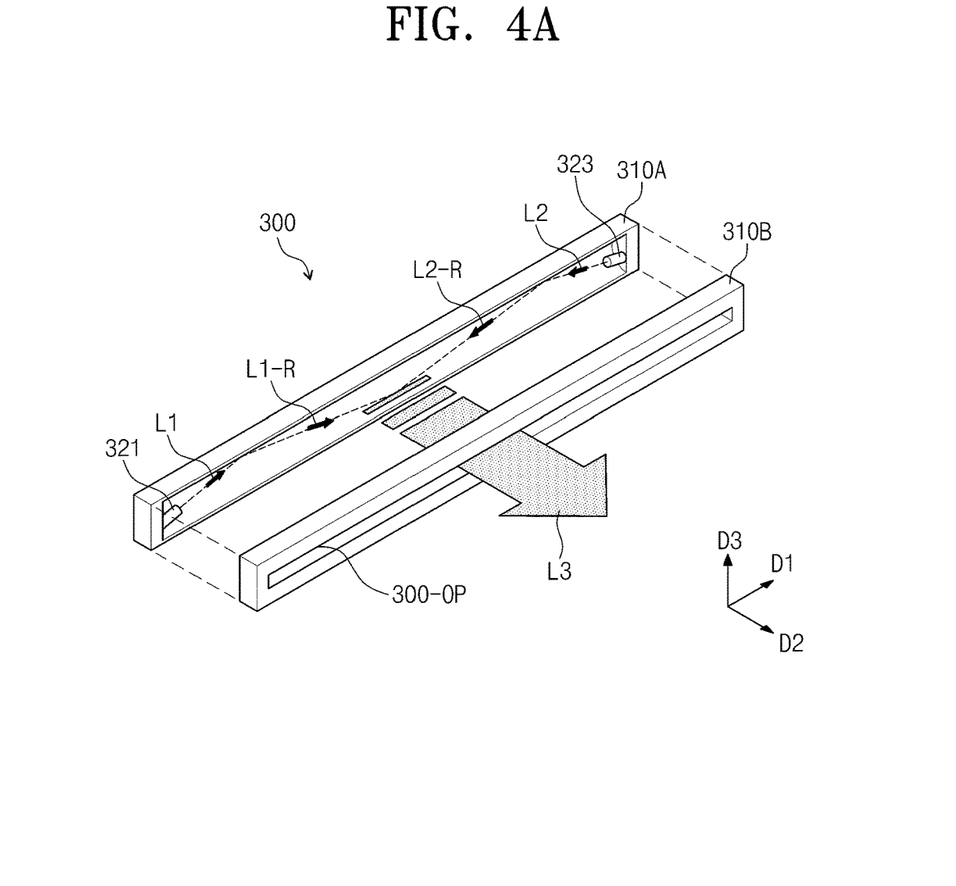
FIG. 4A is an exploded perspective view showing an exemplary embodiment of a light source unit according to the invention.
Figure 4B:
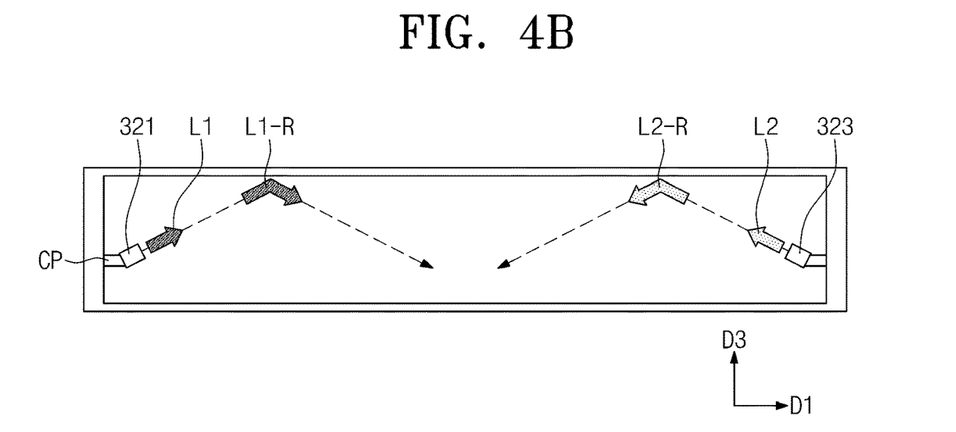
FIG. 4B is a perspective view showing a path of a light traveling through the light source unit.

FIG. 4A is an exploded perspective view showing a light source unit 300 according to an exemplary embodiment of the invention and FIG. 4B is a perspective view showing a path of a light traveling through the light source unit 300. Hereinafter, the light emission principle of the light source unit 300 according to the illustrated exemplary embodiment will be described with reference to FIGS. 4A and 4B. In FIGS. 4A and 4B, the same reference numerals denote the same elements in FIGS. 1 to 3B, and thus detailed descriptions of the same elements will be omitted.

Referring to FIGS. 4A and 4B, a first light source 321 and a second light source 323 are coupled to the inside of a body member 310. The first and second light sources 321 and 323 are disposed to be spaced apart from each other in the first direction D1.

Each of the first and second light sources 321 and 323 provides the light to the cavity 300-SP. Since the first and second light sources 321 and 323 include various elements to emit the light, the first and second light sources 321 and 323 may have a thickness extending in a direction substantially parallel to the direction in which the light travels.

The first and second light sources 321 and 323 according to the illustrated exemplary embodiment are not required to emit light toward the light exit part 300-OP. The first and second light sources 321 and 323 may be disposed to allow the light emission direction of the first and second light sources 321 and 323 to be substantially parallel to the direction in which the cavity 300-SP extends without facing the light guide member 400. Accordingly, the width of the light source unit 300 in the second direction D2 may be reduced.

The width of the light source unit 300 in the second direction D2 is related to a bezel of the display device DS (refer to FIG. 1). In the display device according to the illustrated exemplary embodiment, the light emission direction of the display device should not be limited to the second direction D2, and thus a narrow bezel of the display device may be realized.

As described above, since the cavity 300-SP is defined in the body member 310, the lights emitted from the first and second light sources 321 and 323 are easily combined with each other after being reflected and scattered in the cavity 300-SP. Therefore, the surface light source emitting the lights to the light exit part 300-OP may be realized using the laser diode corresponding to a point light source.

The first light source 321 emits a first light L1 having a first color and provides the first light L1 to the cavity 300-SP, and the second light source 323 emits a second light L2 having a second color and provides the second light L2 to the cavity 300-SP. In the illustrated exemplary embodiment, the first and second colors are the same with or different from each other.

Referring to FIG. 4B, the first light L1 and the second light L2 travel in a direction inclined with respect to the first direction D1. Each of the first and second light sources 321 and 323 is coupled to the body member 310 by predetermined connection portions CP. The connection portions CP control the light emission angle of the first and second light sources 321 and 323, respectively.

In the illustrated exemplary embodiment, each of the first and second lights L1 and L2 travels through the cavity 300-SP at an angle inclined to the third direction D3 from the first direction D1. Accordingly, the first and second lights L1 and L2 travel toward the inside of the body member 310.

The first and second lights L1 and L2 are reflected by the body member 310 and the reflected first light L1-R and the reflected second light L2-R are generated. Each of the first and second lights L1-R and L2-R corresponds to a light reflected once or more. In the illustrated exemplary embodiment, the reflection includes a diffuse reflection and a specular reflection.

The first light L1-R and the second light L2-R are combined with each other to generate a third light L3 having a third color. The third color is obtained by combining two or more colors with each other.

In an exemplary embodiment, the third color is obtained by combining the first color and the second color, for example. In the case that the first and second lights L1 and L2 are specularly reflected by the body member 310, the reflected first and second lights L1-R and L2-R maintain the first and second colors, respectively. Therefore, the third light L3 may have substantially the same color as that of the light obtained by directly combining the first light L1 and the second light L2.

In addition, the third color may be obtained by additionally combining another color to the first and second colors. In the case that the first and second lights L1 and L2 are diffusively reflected by the body member 310, the reflected first light L1-R may have any one color of colors on spectrums of the first color. Similarly, the reflected second light L2-R may have any one color of colors on spectrums of the second color.

Each of the first and second lights L1 and L2 is reflected plural times by the body member 310 and each of the reflected first and second lights L1-R and L2-R is additionally reflected by the body member 310. Due to the angle of the inclination with respect to the first direction D1, a reflection possibility in the cavity 300-SP becomes high.

Thus, the first and second lights L1 and L2 may be scattered into a variety of lights having plural colors. Consequently, the third light L3 may have the color obtained by combining various colors.

In the illustrated exemplary embodiment, the third light L3 may be a white light, for example. As the number of reflection of the first and second lights L1 and L2 in the body member 310 increases, a color purity of the third light L3 is improved.

In addition, as the first and second lights L1 and L2 are reflected along various directions in the body member 310, a possibility in which lights having different colors are combined with each other becomes high and an area in which lights having different colors are combined with each other becomes wide.

The first and second colors are the same with or different from each other. In an exemplary embodiment, in the case where the first color is the same as the second color, the first, second, and third colors may be the same as each other. Accordingly, when the third color is the white color, each of the first and second light sources 321 and 323 may be a white light source, for example.

In another exemplary embodiment, the first, second, and third colors may be different from each other. In an exemplary embodiment, when the third color is the white color, the first color is a blue or green color and the second color is a yellow or orange color, for example. In the exemplary embodiment, the first and second colors are combined with each other to generate the white color.

Although not shown in figures, the light source unit 300 may further include a third light source. The third light source may be disposed in an area in which any one of the first and second light sources is disposed or may be disposed between the first and second light sources, but it should not be limited thereto or thereby.

The third light source may generate a light having the same color as or different color from the first and second color. The third light source provides the light to the cavity 300-SP. Therefore, the third light exiting through the light exit part 300-OP may have a color obtained by combining the lights respectively emitted from the first, second, and third light sources.

As described, since the light source unit 300 according to the illustrated exemplary embodiment includes the body member 310 in which the cavity 300-SP is defined, the light corresponding to the light exit part 300-OP may exit to the outside of the light exit part 300-OP even though the light sources 321 and 323 are disposed such that the light emission direction of the light sources 321 and 323 does not face the light exit portion 300-OP.

The light source unit 300 according to the illustrated exemplary embodiment slightly mitigates the directivity of the lights generated by the first and second light sources 321 and 323 using the body member, and thus a light efficiency of the backlight unit BLU may be improved.

In addition, since the display device DS (refer to FIG. 1) according to the illustrated exemplary embodiment includes the backlight unit BLU (refer to FIGS. 1 and 2), the display device DS may employ the laser beam having the narrow wavelength band as its light source. The laser beam has the relatively narrow wavelength band compared with a light generated by a light emitting diode. Accordingly, a color reproducibility of the display device DS may be improved and the image provided to the user may have more natural colors.

Figure 5A:
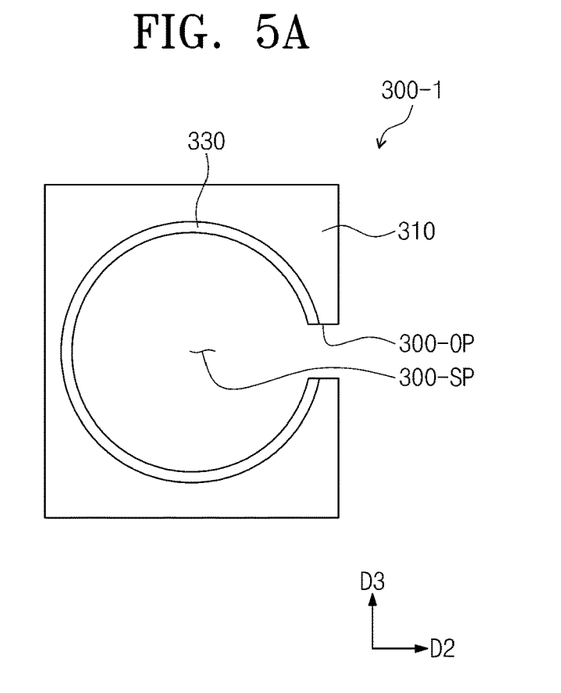
FIGS. 5A and 5B are cross-sectional views showing exemplary embodiments of light source units according to the invention.
Figure 5B:
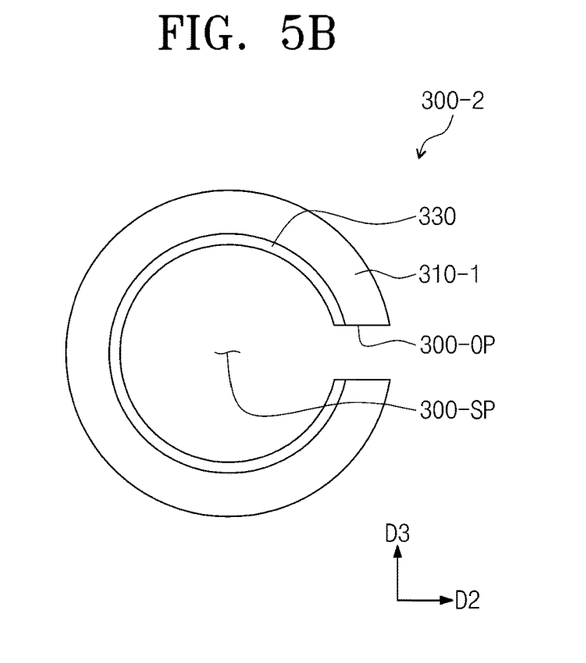
Figure 6A:
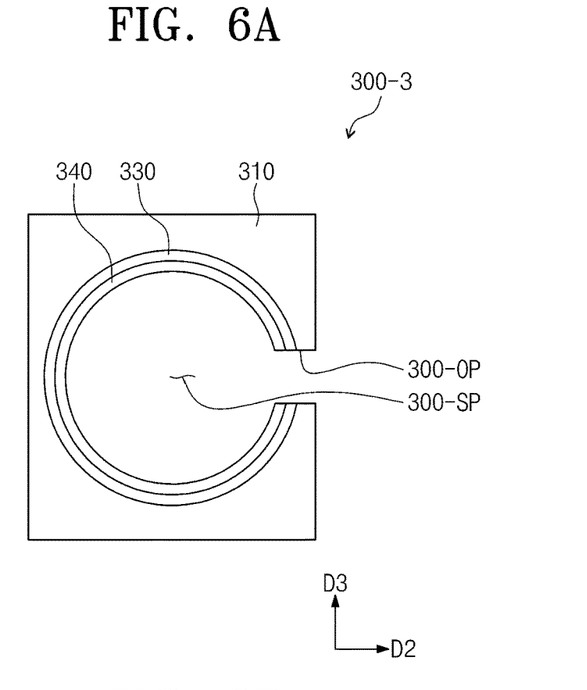
FIGS. 6A and 6B are cross-sectional views showing exemplary embodiments of light source units according to the invention.
Figure 6B:
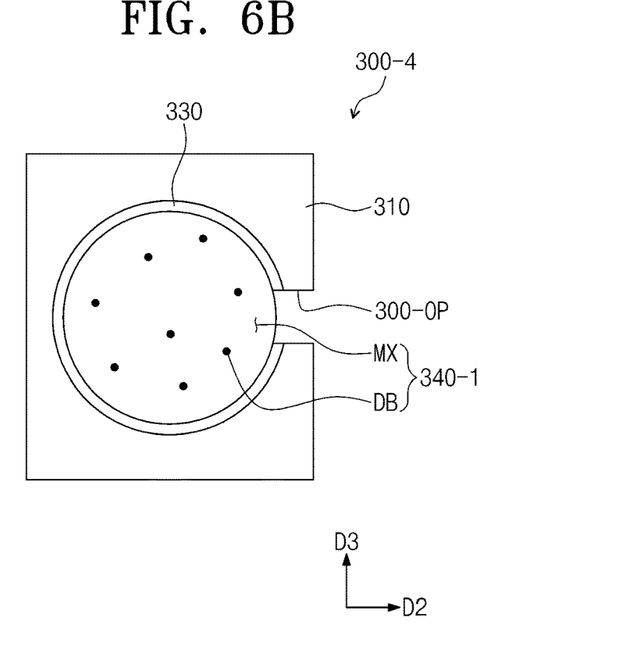

FIGS. 5A and 5B are cross-sectional views showing light source units 300-1 and 300-2 according to embodiments of the invention. FIGS. 6A and 6B are cross-sectional views showing light source units 300-3 and 300-4 according to embodiments of the invention. In FIGS. 5A, 5B, 6A, and 6B, the same reference numerals denote the same elements in FIGS. 1 to 4B, and thus detailed descriptions of the same elements will be omitted.

Referring to FIG. 5A, the light source unit 300-1 may further include a reflective layer 330 disposed on the inner side surface 310-IS of the body member 310. The reflective layer 330 covers the inner side surface 300-IS. The reflective layer 330 improves a reflectance of the light incident to the inner side surface 300-IS (refer to FIG. 3B).

The reflective layer 330 includes a material having a high reflectance. In an exemplary embodiment, the reflective layer 330 includes a metal having a white color, e.g., silver (Ag), aluminum (Al), platinum (Pt), etc., for example. The reflective layer 330 may include various materials as long as the materials reflect the light incident to the inner side surface 310-IS and should not be limited to a specific material.

The body member according to the illustrated exemplary embodiment may have a variety of shapes. In an exemplary embodiment, the light source unit 300-2 may include a body member 310-1 having a cylindrical shape as shown in FIG. 5B, for example.

The body member 310-1 has a circular shape on a plane defined by the second and third directions D2 and D3. Therefore, the light source unit 300-2 has a cylindrical shape extending in the first direction D1 (refer to FIG. 1).

However, although the shape of the body member 310-1 is different from that of the body member 310, the shape of the inner side surface 310-IS and the shape of the cavity 300-SP defined by the inner side surface 310-IS may be maintained. Therefore, the light source unit according to the illustrated exemplary embodiment may have various shapes.

The light source unit according to the illustrated exemplary embodiment may further include a functional layer. In an exemplary embodiment, the light source unit 310-3 may further include a scattering layer 340 covering the reflective layer 330 as shown in FIG. 6A, for example. The scattering layer 340 scatters the light incident to the reflective layer 330 and the light reflected from the reflective layer 330.

Although not shown in figures, in an exemplary embodiment, the scattering layer 340 may include a multi-lens array ("MLA") including a plurality of lens patterns, for example. The MLA scatters the light incident to the scattering layer 340 to allow the light to be dispersed in various directions and colors.

In another exemplary embodiment, the light source unit 310-4 may further include a scattering member filled in the cavity 300-SP (refer to FIG. 6A) as shown in FIG. 6B. The scattering member 340-1 allows the path of the light to be diversified in the cavity 300-SP, and thus lights different from each other are easily combined with each other.

As shown in FIG. 6B, the scattering member 340-1 may include a matrix MX and a plurality of beads DB distributed in the matrix MX. The matrix MX may include a transparent resin having a low light absorbance such that the light efficiency is not deteriorated.

The light reflected by the reflective layer 330 or the body member 310 travels along the matrix MX and is scattered by the beads DB. Thus, the various lights traveling in the cavity 300-SP may be uniformly combined with each other by the scattering member 340-1 over the entire area of the body member 310.

Figure 7:
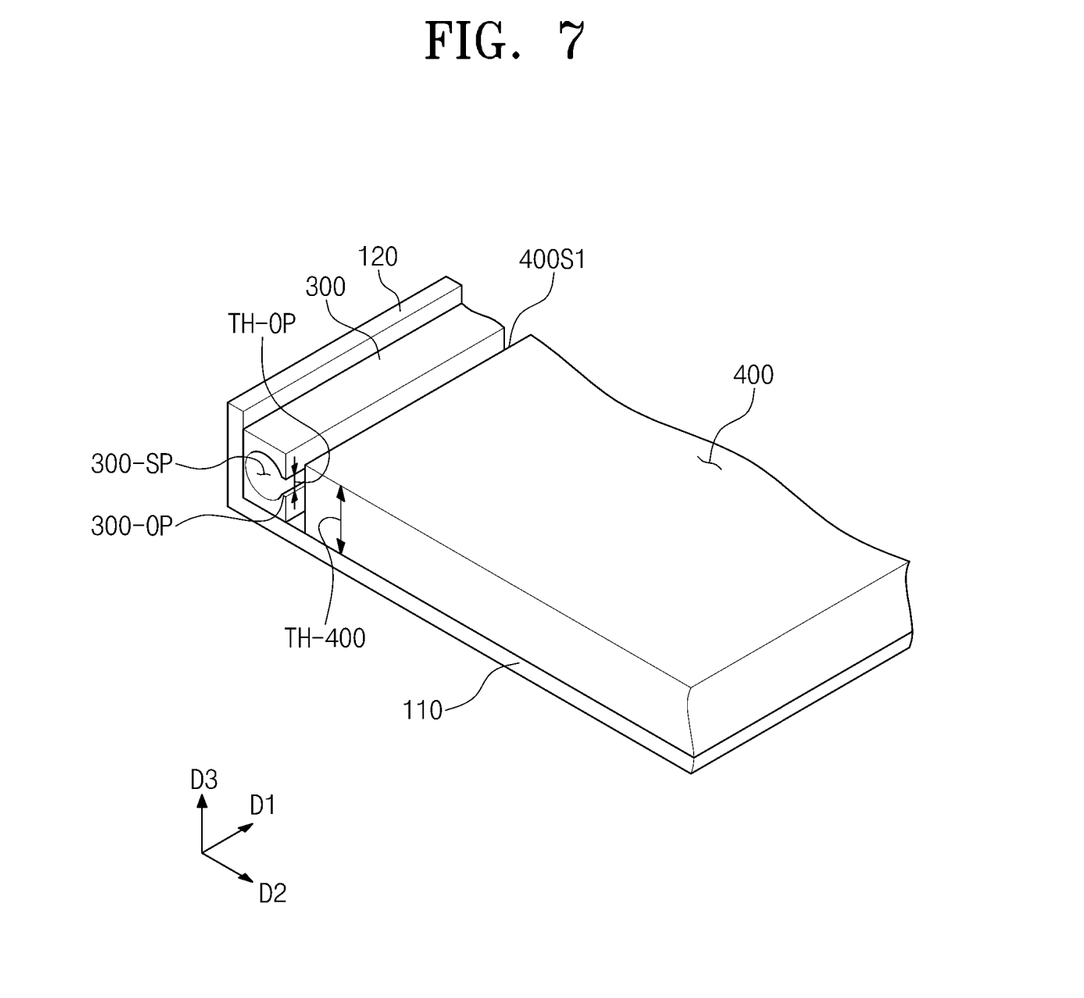
FIG. 7 is a perspective view showing an exemplary embodiment of a portion of a display device according to the invention.

FIG. 7 is a perspective view showing a portion of a display device according to an exemplary embodiment of the invention. For the convenience of explanation, FIG. 7 shows a backlight unit BLU (refer to FIGS. 1 and 2) accommodated in a lower protective member 100L.

Hereinafter, the backlight unit BLU will be described in detail with reference to FIG. 7. In FIG. 7, the same reference numerals denote the same elements in FIGS. 1 to 6B, and thus detailed descriptions of the same elements will be omitted.

Referring to FIG. 7, the backlight unit BLU is accommodated in a space defined by a bottom portion 110 and a sidewall portion 120. In the illustrated exemplary embodiment, since the lower protective member 100L (refer to FIG. 1) accommodates the backlight unit BLU and the display panel 200 (refer to FIG. 1), the sidewall portion 120 has a height greater than a height of the light source unit 300. According to other exemplary embodiments, the height of the light source unit 300 may be the same as or greater than the height of the sidewall portion 120.

As shown in FIG. 7, a light exit part 300-OP faces a first surface 400S1 corresponding to an incident surface of the light guide member 400. In this case, a thickness TH-OP of the light exit part 300-OP, which is measured in the third direction D3, may be equal to or smaller than a thickness TH-400 of the light guide member 400.

A thickness TH-OP of the light exit part 300-OP corresponds to a light emission width of the light emitted from the light source unit 300 in the third direction D3. Accordingly, as the thickness TH-OP of the light exit part 300-OP is smaller than the thickness TH-400 of the light guide member 400, an amount of the light leaking from the light guide member 400, and thus the light efficiency may be prevent from being lowered.

The light source unit 300 according to the illustrated exemplary embodiment converts the point light source to the surface light source using the light exit part 300-OP and provides the surface light source to the light guide member 400. As described above, the light source unit 300 scatters, disperses, and combines the lights emitted from the point light source using the cavity 300-SP and provides the light to first surface 400S1.

Figure 8:
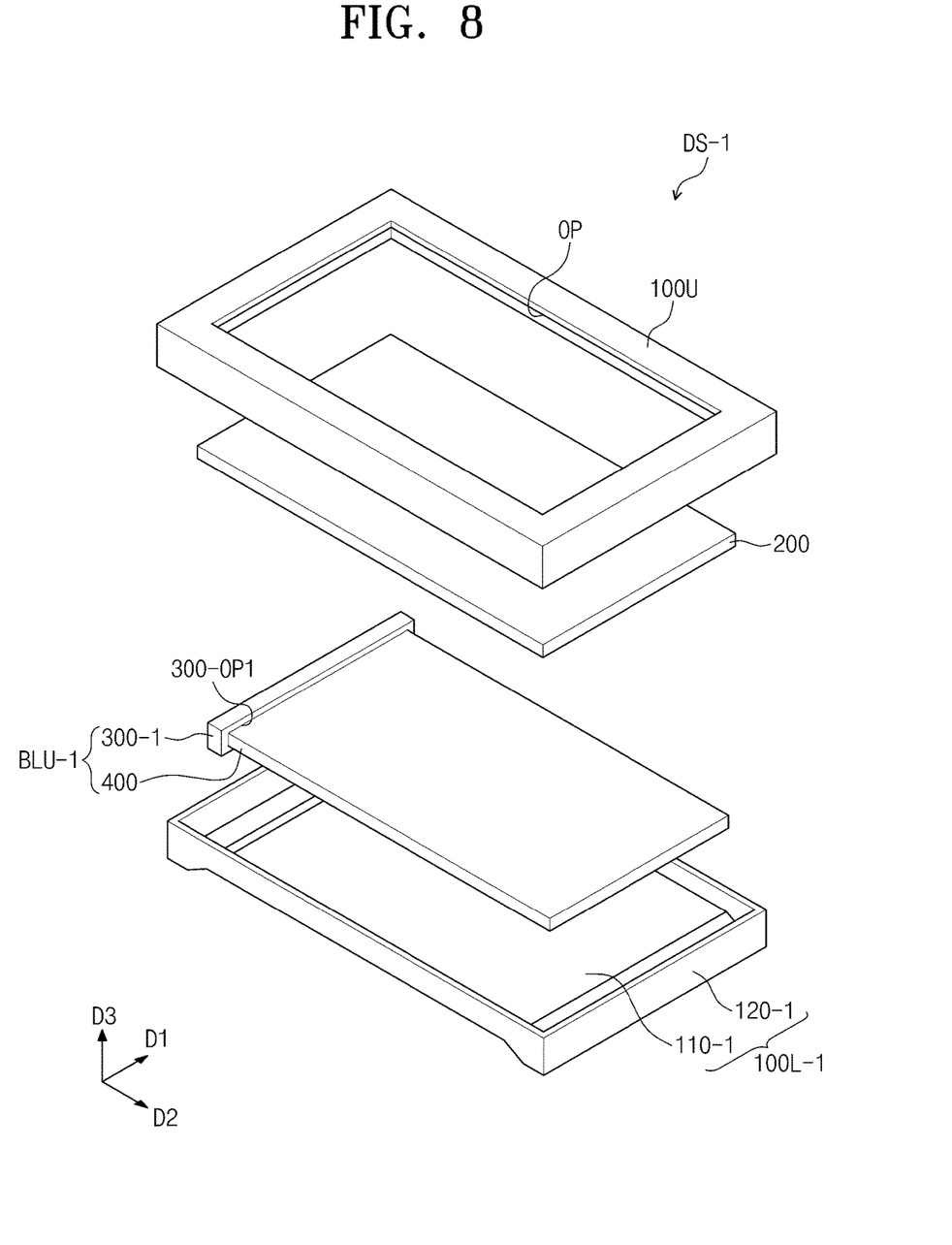
FIG. 8 is an exploded perspective view showing an exemplary embodiment of a display device according to the invention.
Figure 9:
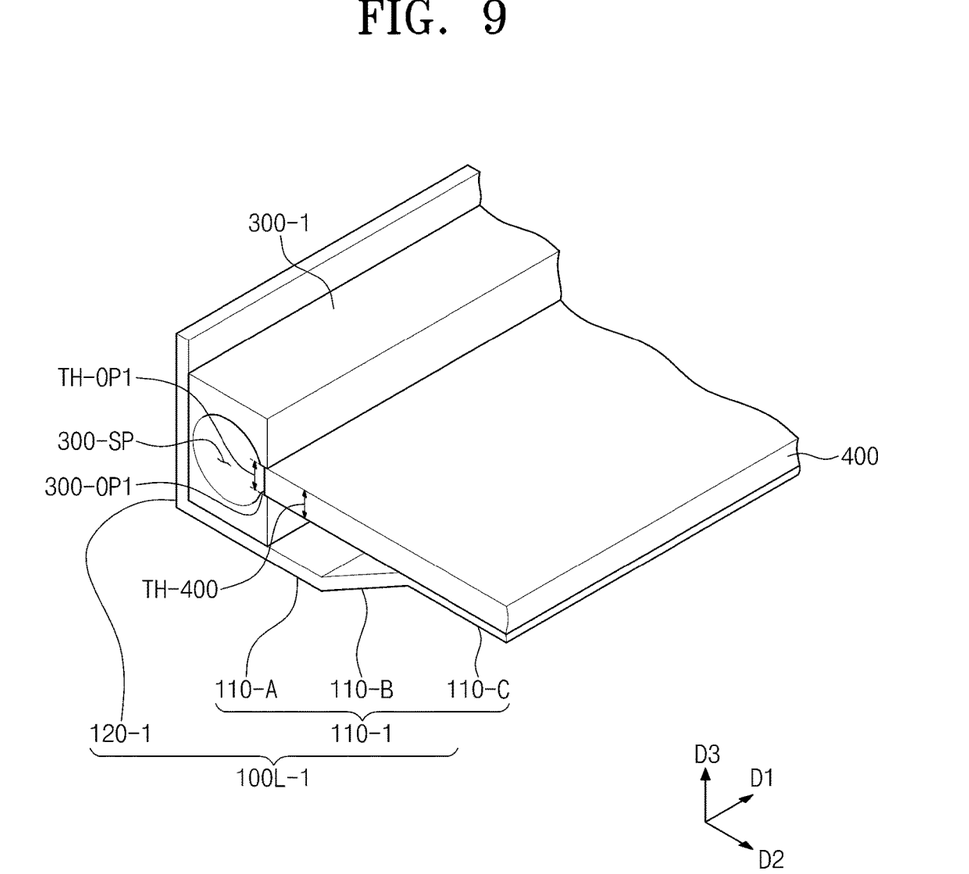
FIG. 9 is a perspective view showing a portion of the display device shown in FIG. 8.

FIG. 8 is an exploded perspective view showing a display device DS-1 according to an exemplary embodiment of the invention and FIG. 9 is a perspective view showing a portion of the display device shown in FIG. 8.

Hereinafter, the display device DS-1 will be described in detail with reference to FIGS. 8 and 9. In FIGS. 8 and 9, the same reference numerals denote the same elements in FIGS. 1 to 7, and thus detailed descriptions of the same elements will be omitted.

Referring to FIGS. 8 and 9, a light guide member 400 may be inserted into a light source unit 300-1. Accordingly, a backlight unit BLU-1 may be a single unitary unit.

In detail, at least a portion of the light guide member 400 may be inserted into a light exit part 300-OP1. In this case, a thickness TH-OP1 of the light exit part 300-OP1 may be substantially the same as a thickness TH-400 of the light guide member 400.

A first surface 400S1 (refer to FIG. 7B) corresponding to the incident surface of the light guide member 400 may be provided in the cavity 300-SP. Since the light guide member 400 is tightly inserted into the light exit part 300-OP1, the light in the cavity 300-SP may be directly incident to the light guide member 400. Therefore, the light may be prevented from leaking through the light guide member 400 and the light efficiency may be improved.

A shape of a lower protective member 100L-1 may be deformed to correspond to the backlight unit BLU-1. In an exemplary embodiment, a bottom portion 110-1 of the lower protective member 100L-1 may have a step difference compared with the bottom portion 110 shown in FIG. 1, for example.

A sidewall portion 120-1 is bent to a third direction D3 from edges of the bottom portion 110-1. The sidewall portion 120-1 prevents the backlight unit BLU-1 from moving in first and second directions D1 and D2.

The bottom portion 110-1 has the step difference. In detail, the bottom portion 110-1 includes a first portion 110-A, a second portion 110-B, and a third portion 110-C when viewed in a plan view. The first portion 110-A is disposed at a lowermost position in the bottom portion 110-1. The light source unit 300-1 may be disposed on the first portion 110-A.

The first portion 110-A may be provided in a plural number, and in this case, the first portions 110-A are arranged in the second direction D2 to be spaced apart from each other. However, according to other exemplary embodiments, portions of the first portions, on which the light source unit 300-1 is not disposed, may be omitted.

The second portion 110-B is connected to the first portion 110-A and is bent upward from the first portion 110-A. The second portion 110-B may be a slant surface inclined at a predetermined angle with respect to the first portion 110-A. The second portion 110-B connects the first portion 110A and the third portion 110-C.

The third portion 110-C is connected to the second portion 110-B. The third portion 110-C is substantially parallel to the first portion 110-A and inclined with respect to the second portion 110-B. The third portion 110-C is disposed at an uppermost position in the bottom portion 110-1.

The light source unit 300-1 is supported by the first portion 110-A and the light guide member 400 is supported by the third portion 110-C. Since the light guide member 400 is inserted into the light exit part 300-OP1, the second and third portions 110-B and 110-C compensate for the step difference between the light guide member 400 and the first portion 110-A.

Thus, since the light guide member 400 is inserted into the light exit part 300-OP1, the light guide member 400 may be prevented from sagging due to gravity and the light guide member 400 may be stably coupled to the light source unit 300-1.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A backlight unit comprising:
   a light guide member comprising an upper surface substantially parallel to a plane defined by a first direction and a second direction crossing the first direction, a lower surface spaced apart from the upper surface in a third direction crossing the first and second directions, and a plurality of connection surfaces connecting the upper surface and the lower surface, at least one connection surface of the plurality of connection surfaces being provided with an incident surface defined thereon, the incident surface extending in the first direction; and
   a light source unit which generates a light and provides the light to the incident surface, the light source unit comprising:
   a body member extending in the first direction, comprising a cavity in which one side of the body member is open, and a light exit part connected to one side of the cavity facing the incident surface of the cavity is defined;
   a first light source disposed in the cavity and comprising a laser diode generating a first light having a first color; and
   a second light source disposed in the cavity to be spaced apart from the first light source in the first direction and comprising a laser diode which generates a second light having a second color,
   wherein the body member provides a third light having a third color obtained by combining the first and second colors to the incident surface through the light exit part.

2. The backlight unit of claim 1, wherein the incident surface is substantially parallel to a plane defined by the first direction and the third direction and the light exit part is a slit extending in the first direction.

3. The backlight unit of claim 2, wherein a width of the light exit part in the third direction is equal to or smaller than a width of the incident surface in the third direction.

4. The backlight unit of claim 3, wherein the width of the light exit part in the third direction is substantially the same as the width of the incident surface in the third direction.

5. The backlight unit of claim 4, wherein at least a portion of the light guide member is inserted into the light exit part and the incident surface is exposed in the cavity.

6. The backlight unit of claim 5, wherein the body member comprises:
   an inner side surface defining the cavity; and
   an outer side surface connected to the inner side surface and defining an outer shape of the body member, the light exit part is defined at a position at which the inner side surface is connected to the outer side surface, and the first and second lights are reflected by the inner side surface and combined with each other.

7. The backlight unit of claim 6, wherein the light source unit further comprises a reflective layer covering the inner side surface.

8. The backlight unit of claim 7, wherein the light source unit further comprises a scattering layer covering the reflective layer and being exposed to the cavity.

9. The backlight unit of claim 8, wherein the scattering layer comprises a plurality of lens patterns.

10. The backlight unit of claim 7, wherein the light source unit further comprises:
    a transparent matrix filled in the cavity; and
    a plurality of beads distributed in the transparent matrix.

11. The backlight unit of claim 1, wherein the cavity has a circular shape on a plane defined by the second direction and the third direction.

12. The backlight unit of claim 1, wherein a path in which the first light emitted from the first light source travels and a path in which the second light emitted from the second light source travels are inclined at a predetermined angle with respect to the first direction.

13. The backlight unit of claim 12, wherein the third color is a white color.

14. The backlight unit of claim 13, wherein the first color is different from the second color.

15. The backlight unit of claim 12, wherein the first color, the second color, and the third color are same as each other.

16. A display device comprising:
    a display panel which displays an image on a front surface defined by a first direction and a second direction crossing the first direction;
    a backlight unit disposed at a rear surface of the display panel to provide a light to the display panel; and
    an accommodating member accommodating the display panel and the backlight unit, the backlight unit comprising:
    a light source unit extending in the first direction and comprising a light exit part extending in the first direction, providing the light to the second direction through the light exit part, and defining a cavity therein, the cavity extending in the first direction and connected to the light exit part; and
    a light guide member comprising an upper surface facing the rear surface of the display panel, a lower surface parallel to the upper surface, first and second surfaces extending in the first direction and facing each other in the second direction, and third and fourth surfaces extending in the second direction and facing each other in the first direction,
    wherein the light exit part faces the first surface, the light source unit comprises at least one laser diode, and the at least one laser diode provides the light to the cavity.

17. The display device of claim 16, wherein the cavity has a circular shape in a cross-section on a plane defined by the second direction and a thickness direction of the light guide member.

18. The display device of claim 17, wherein the light source unit comprises:
    a body member defining the cavity and the light exit part;
    a first light source which is disposed at one side portion of the body member and provides the light to the cavity; and
    a second light source disposed at the other side portion of the body member, spaced apart from the first light source in the first direction, and comprising a second light source providing a light to the cavity, and each of the first and second light sources comprises a laser diode.

19. The display device of claim 16, wherein at least a portion of the light guide member is inserted into the light exit part and the first surface is provided in the cavity.

20. The display device of claim 19, wherein the accommodating member comprises:
    a bottom portion disposed under the backlight unit; and
    a sidewall portion bent upward from edges of the bottom portion and defining a predetermined space together with the bottom portion, and the bottom portion has a stepped shape to support the light source unit and the light guide member.

* * * * *